J. C. Taylor,
Corpse Cooler.
No. 105,013.    Patented July 5, 1870.
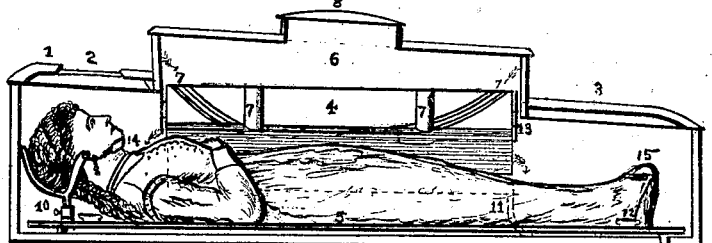
Fig. 1.
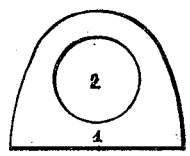
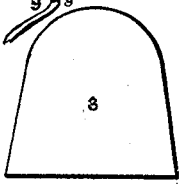
Fig. 2.
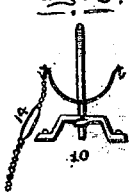
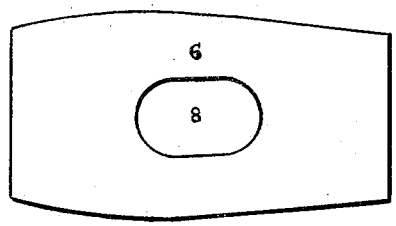
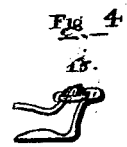
Fig. 3.    Fig. 4.
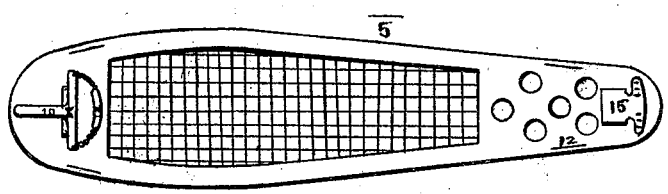
Fig. 5.
WITNESSES.
INVENTOR
James C. Taylor.

United States Patent Office.

JAMES C. TAYLOR, OF TRENTON, NEW JERSEY.

Letters Patent No. 105,013, dated July 5, 1870.

IMPROVEMENT IN CORPSE-PRESERVER.

The Schedule referred to in these Letters Patent and making part of the same.

*To all whom it may concern:*

Be it known that I, JAMES C. TAYLOR, of the city of Trenton, county of Mercer, and State of New Jersey, have invented new and useful Improvements in Corpse-Preserver, of which the following is a full, clear, and exact description, reference being had to the accompanying drawings forming part of this specification, and in which—

Figure 1 represents a horizontal sectional view of corpse-preserver, with my improvements applied.

Figure 2 represents a cross-section of ice-pan, with my improvements applied, as denoted by 7, 16, and 13.

Figure 3 is a combined head-rest and chin-support.

Figure 4 is a rest to retain feet in proper position.

Figure 5, cooling-board, provided with cane bottom.

Like figures refer to like parts through the several figures.

The ice-pan or pans are provided with air-tight covers, and secured to the top by any suitable mechanical device. The under side of ice-pan or pans is arranged with rubber, or other suitable cloth, encircling the bottom of pan, and for the purpose of catching the frost that collects on bottom of pan, and prevents it from falling on the clothes of the corpse, thereby preventing any wet or damage to the clothes.

The rubber tubes 11, attached to ice-pan, are connected to rubber tube 9 in the box, by couplings or slip-joints, through which, and by the air-tight cover 17, the ice-pan is made air-tight.

A part of my invention consists of a head-rest, shown in fig. 3, with a chin-support, 14, which serves to keep the head in proper position, chin and mouth closed.

The second part consists in providing a foot-rest, by which the feet and legs are held together.

To enable others skilled in the art, to make and use the same, I will now proceed to describe the construction and use of my invention.

The corpse-preserver consists of an external box, provided with a board, placed in bottom of said box, and upon which is laid the corpse to be preserved.

This cooling-board has suitable handles attached, for the purpose of lifting out the corpse. The head and foot-rest are attached to cooling-board.

The cane bottom of the cooling-board is well adapted to the purpose for which it is intended, by its openings, and raising of cooling-board above the bottom of external box, the cold air is allowed to pass under the corpse.

The corpse being placed in box, as above described, the ice-pan or pans, which is the most important feature of my invention, shown in fig. 2, is secured over the body by the double bolts 13, operated by one lever at each end of pan or pans.

The pan or pans are constructed of tin, or other metal, provided with air-tight cover. Encircling the bottom is a water-proof cloth, to prevent the dampening or wetting of the clothes of the corpse, as, by this, a corpse may be dressed ready for laying out before putting in the preserver.

The pan is also provided with air-cooling tubes, arranged and constructed in the pan or pans in such a manner that the air will pass on the inside of said tubes, and will be made cold by the ice on the external surface of tubes placed in the ice-pan or pans, and will descend to the bottom of the box. By this arrangement of tubes the coldest air is circulated to the corpse, and also gives a large cooling surface for the ice to act upon.

11 are rubber pipes, for carrying off waste water from melted ice. These pipes may be connected to rubber pipe 9.

Head-rest is shown in fig. 3, made to raise or lower, with a chin-support, 14, combined.

Fig. 4 represents foot-rest, which may be adjusted to suit the body, and has a strap combined with it to hold the feet and legs together.

The remaining figures are face, foot, and center cover to the external box. The face-cover has a glass, 2, and center a small cover, 8.

I am aware that the ice-box has been adjusted vertically, to accommodate corpses of varying size.

I claim as my invention—

1. In combination with the inserted ice-box, the rubber encircling the bottom, at a short distance below it, and secured in that position in any suitable way, all as and for the purpose described.

2. In combination with the inserted ice-receptacle, the double bolts, working in a series of openings, to adjust the box vertically.

3. In combination with the cooling-board, the head-rest, adjustable vertically, and providing a rest for the back of the head and an adjustable support for the chin.

4. In combination with the cooling-board, the foot-rest, with openings for adjusting straps.

JAMES C. TAYLOR.

Witnesses:
WM. H. BARLOW,
JAMES S. KIGER.